(12) United States Patent
Bloom

(10) Patent No.: US 6,323,980 B1
(45) Date of Patent: Nov. 27, 2001

(54) HYBRID PICOCELL COMMUNICATION SYSTEM

(75) Inventor: Scott H. Bloom, Encinitas, CA (US)

(73) Assignee: Air Fiber, Inc., San Diego, CA (US)

(*) Notice: Subject to any disclaimer, the term of this patent is extended or adjusted under 35 U.S.C. 154(b) by 0 days.

(21) Appl. No.: 09/035,370

(22) Filed: Mar. 5, 1998

(51) Int. Cl.$^7$ ............ H04B 10/00; H04B 10/04; H04B 10/06; H04B 10/10

(52) U.S. Cl. ............ 359/159; 359/154; 359/155; 359/172

(58) Field of Search ............ 359/172, 152, 359/154, 159, 145

(56) References Cited

U.S. PATENT DOCUMENTS

| | | | | |
|---|---|---|---|---|
| 4,730,310 | * | 3/1988 | Acampora et al. | 370/95 |
| 4,789,983 | * | 12/1988 | Acampora et al. | 370/96 |
| 5,264,955 | * | 11/1993 | Sakanaka | 359/152 |
| 5,493,436 | | 2/1996 | Karasawa et al. | 359/145 |
| 5,710,652 | * | 1/1998 | Bloom et al. | 359/152 |
| 6,049,593 | * | 4/2000 | Acampora | 379/56.2 |

FOREIGN PATENT DOCUMENTS

| | | |
|---|---|---|
| 0 859 478 A2 | 8/1998 | (EP) . |
| 2 261 575 A | 5/1993 | (GB) . |
| 98/32250 | 7/1998 | (WO) . |

OTHER PUBLICATIONS

Wake et al., "Passive Picocell–A future integrated wireless communications network," British Telecommunications Engineering 16:109–112 (1997).

* cited by examiner

*Primary Examiner*—Leslie Pascal
*Assistant Examiner*—Agustin Bello
(74) *Attorney, Agent, or Firm*—Fish & Richardson, P.C.

(57) ABSTRACT

A free-space laser communication system. The system is comprised of a large number of picocells. Each picocell comprises a base station providing conventional communication with at least one user but typically several or many users. Each base stations comprise at least two laser transceivers each transceiver having a pointing mechanism for automatic alignment. These transceivers provide communication with other base stations, relay information between other base stations or transmit information to conventional communication systems. The picocells cover relatively small geographical ranges such as about 100 meters. Applicant has demonstrated that at these distances atmospheric effects attenuating laser beams are not a serious problem. In a preferred embodiment the base stations generally comprise four laser transceivers with micro processor controlled pointing equipment which are aligned automatically to point at other base stations and an RF transceiver to provide communication with users. The present invention is especially suited for providing a communication system, which can be almost immediately installed to compete with established local monopoly (or near monopoly) telephone systems. Systems according to the present invention can be installed within a few hours or a very few days. These systems can provide, for a local area, its first communication system, or provide communication services in a local area in the event an existing local system is damaged such as in a natural disaster or provide a quick temporary expansion of existing communication capacity.

15 Claims, 17 Drawing Sheets

ZERO ENCODERS

SINGLE STEP

HOME SELECTED AXES

HYBRID PICOCELL COMMUNICATION SYSTEM

The present invention relates to communication systems and in particular to free space optical communication systems.

BACKGROUND OF THE INVENTION

During the past several years, the telecommunication industry has enjoyed an explosive growth. The industry has strained to meet the demand. Global, national and regional telecommunication techniques primarily include: (1) telephone networks providing voice, data and FAX transmission using twisted wire, coaxial cable, fiber optics and microwave systems, RF networks; (2) television networks providing television through RF transmission, cable systems providing television through fiber optic and coaxial cable systems; and the internet communication system. Television, telephone and data communication is also currently being provided through satellite-based systems. Non-voice communication including high-speed data, image and video communication has provided a need for data rate communication much higher than that required for voice communication.

Radio communication permits the user to be mobile. It does not require expensive wiring connecting the communication equipment. The problem with radio communication is that the available radio bandwidth is limited. A solution to limited radio bandwidth is to create many separate geographical cells and to use an available bandwidth over and over again in very many of these separate cells. A large number of separate cells using the same bandwidth can increase greatly the number of users of a given bandwidth. The larger the number of cells, the larger the number of potential users. This is the theory behind the currently popular cellular telephone systems.

In the past telephone and cable systems have generally operated on a regulated monopoly basis. Currently, however, the federal, state and local governments in the United States are encouraging competition in the provision of these services. Local telephone and cable companies are reluctant or charge dearly to share their installed infrastructure and the installation of new cable or fiber optics is generally very expensive and disruptive. In many developing countries there is no significant wired communication infrastructure in place and installing a wired infrastructure would be expensive and disruptive. Certain events such as the Olympic Games and the Super Bowl create temporary need for greatly expanded communication in a region. Disasters such as major ice storms or hurricanes can disrupt existing communications creating a need for temporary communication equipment until the existing system can be repaired. Techniques for providing free space optical communications are known. (See "A Brief History of Free-Space Laser Communications" by David L. Begley in *Selected Papers on Free-Space Laser Communications*, David L. Begley, ed., SPIE Optical Engineering Press, 1991.) Free space laser communication has been proposed for satellite to satellite communication. This is because laser beams can provide high bandwidth long distance efficient communication above the earth's atmosphere. However, free space laser communication has generally not been seriously considered for wide spread terrestrial communication because of the perceived adverse effects of atmospheric condition such as rain, fog and snow.

What is needed is a local telecommunication system, which can be installed easily, efficiently and without significant disruption.

SUMMARY OF THE INVENTION

The present invention provides a free-space laser communication system. The system is comprised of a large number of picocells. Each picocell comprises a base station providing conventional communication with at least one user but typically several or many users. Each base station comprises at least two laser transceivers each transceiver having a pointing mechanism for automatic alignment. These transceivers provide communication with other base stations, relay information between other base stations or transmit information to conventional communication systems. The picocells cover relatively small geographical ranges such as about 100 meters. Applicant has demonstrated that at these distances atmospheric effects attenuating laser beams are not a serious problem. In a preferred embodiment the base stations generally comprise four laser transceivers with micro processor controlled pointing equipment which are aligned automatically to point at other base stations and an RF transceiver to provide communication with users.

The present invention is especially suited for providing a communication system which can be almost immediately installed to compete with established local monopoly (or near monopoly) telephone systems. Systems according to the present invention can be installed within a few hours or a very few days. These systems can provide, for a local area, its first communication system, or provide communication services in a local area in the event an existing local system is damaged such as in a natural disaster or provide a quick temporary expansion of existing communication capacity.

BRIEF DESCRIPTION OF THE PREFERRED EMBODIMENT

Figure 13:
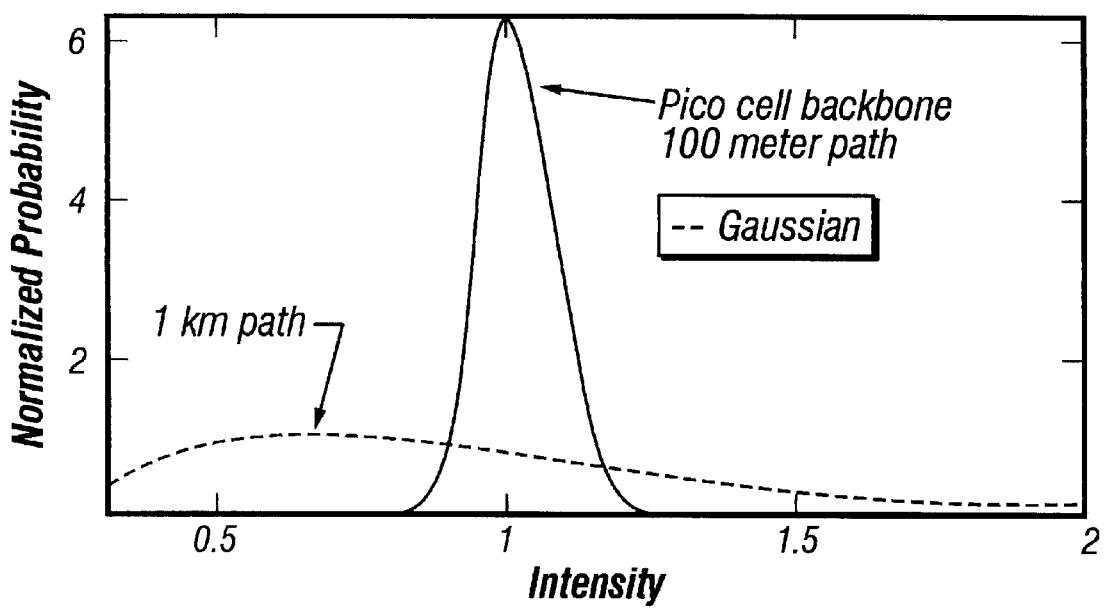

FIG. 13 demonstrates the effects of scintillation at short and long distances.

Figure 14:
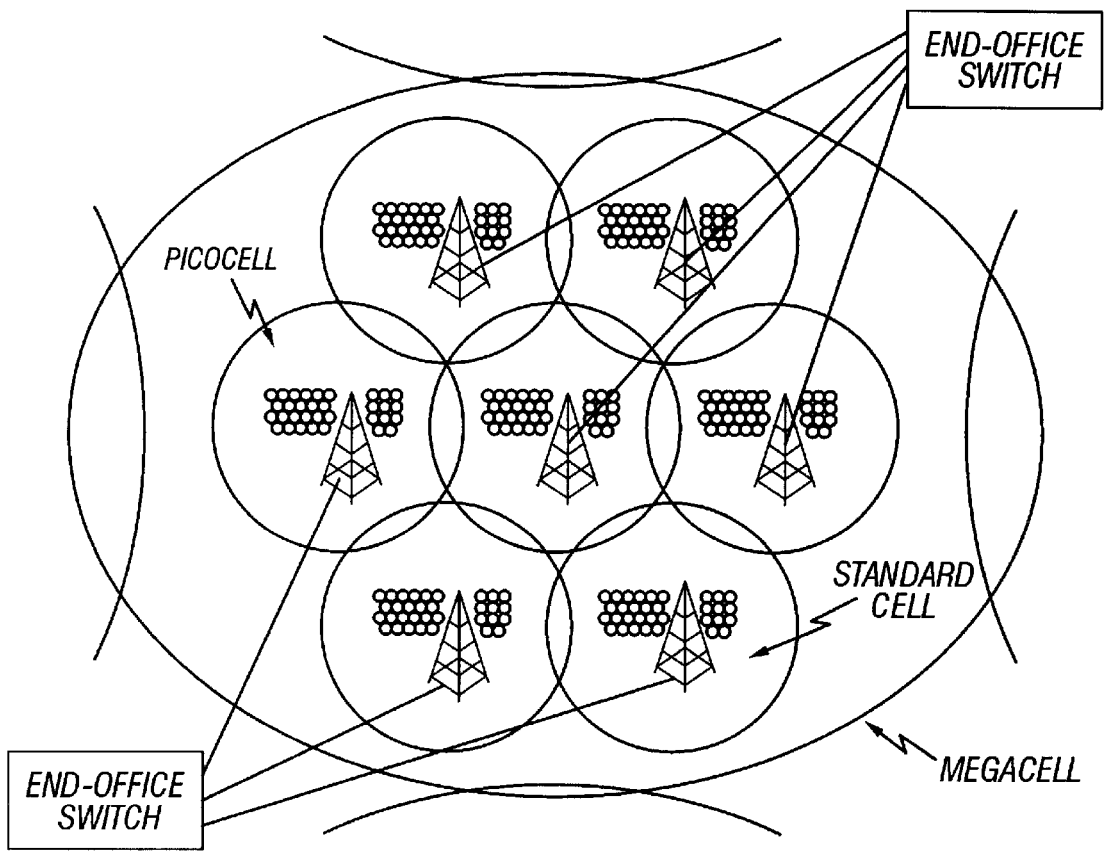

FIG. 14 shows a regional communication system based on the present invention.

Figure 15:
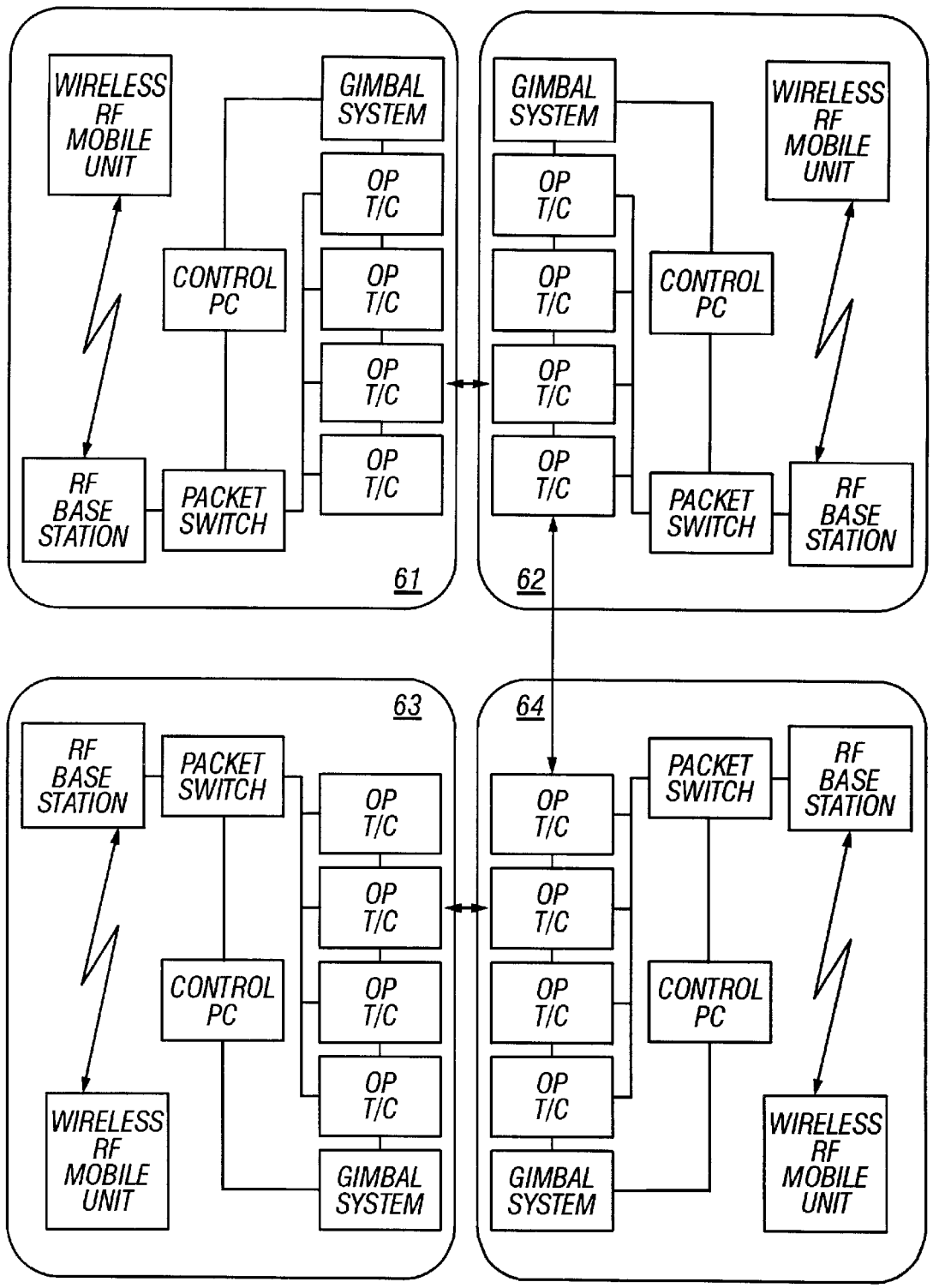

FIG. 15 is a drawing showing four picocells interconnected.

Figure 16:
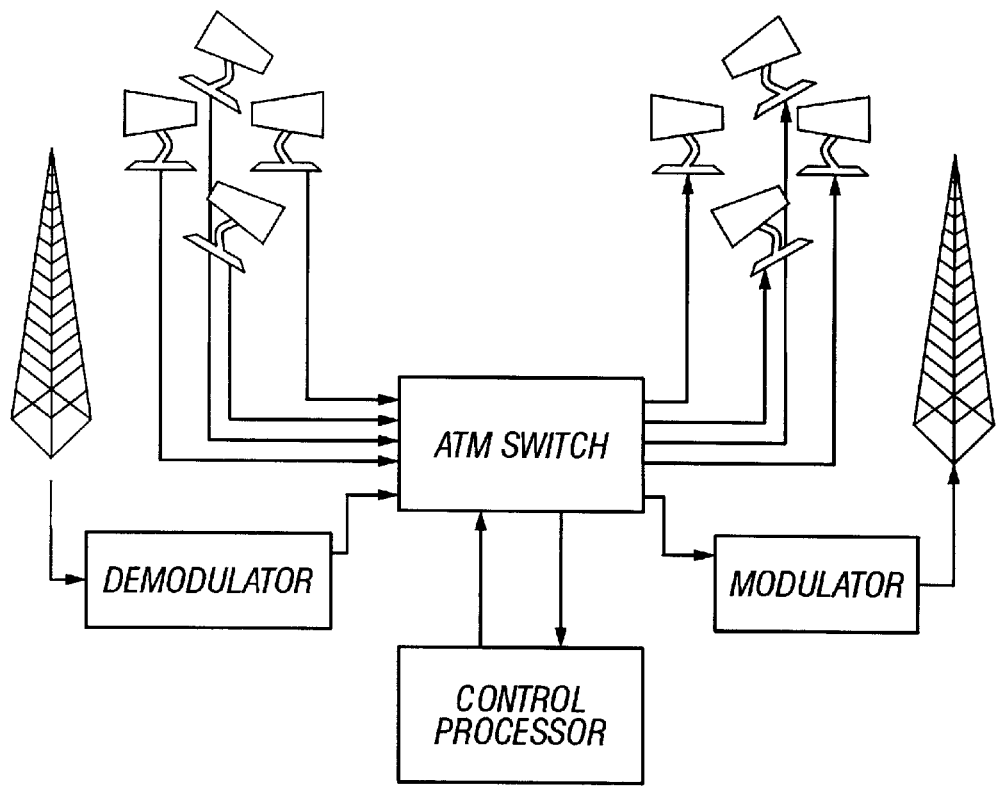

FIG. 16 shows the importance of an ATM switch in a preferred embodiment.

Figure 17:
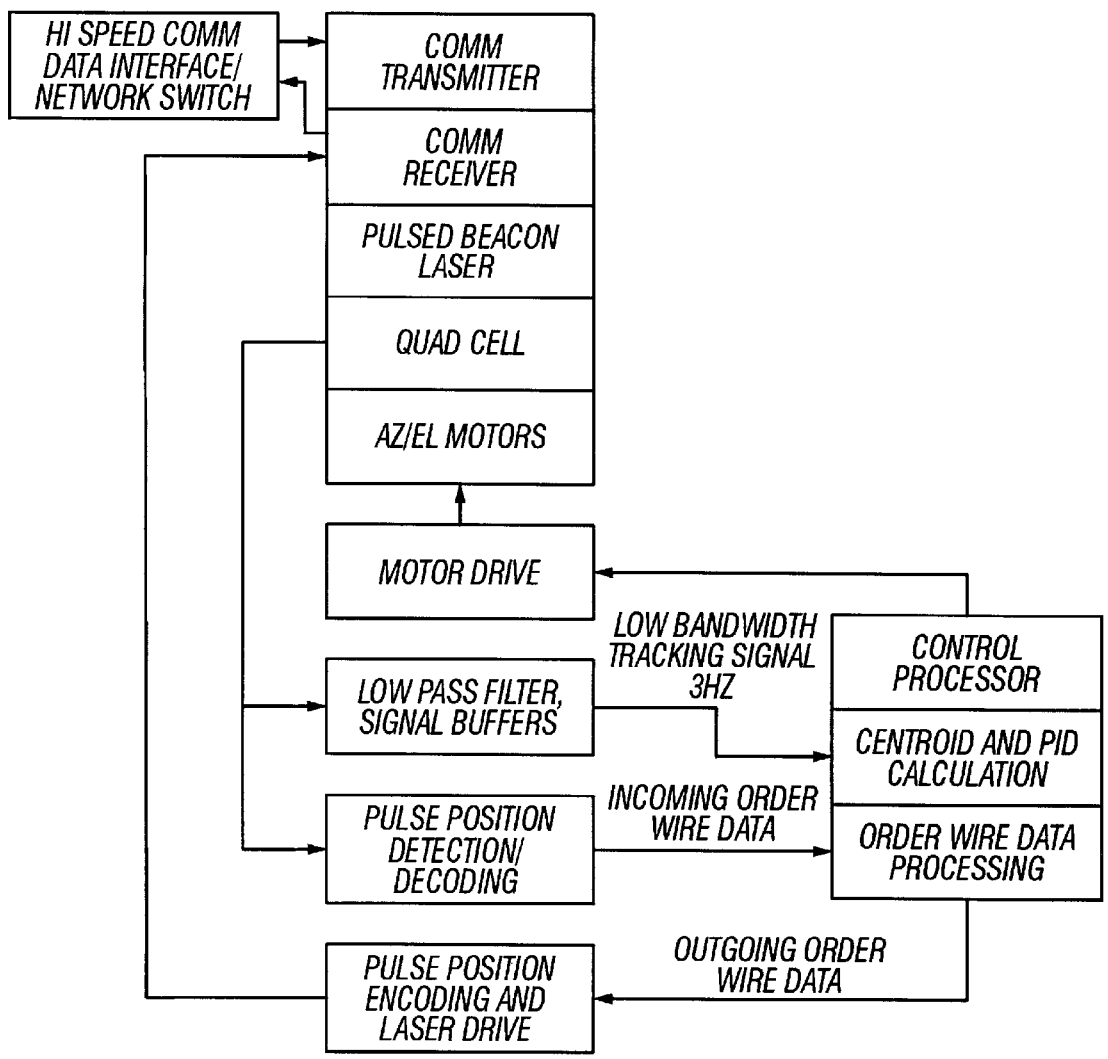

FIG. 17 is a block diagram of the scanning and tracking hardware of a preferred embodiment of the present invention.

Figure 18A:
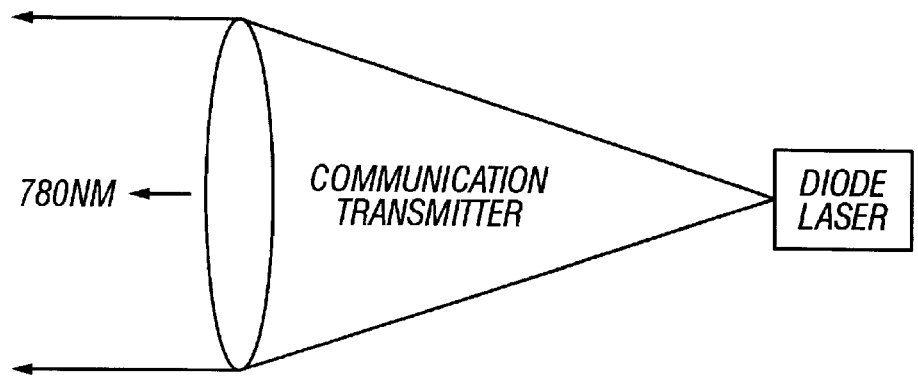

FIGS. 18A, B and C show optical elements of a laser transceiver of a preferred embodiment.

Figure 19:
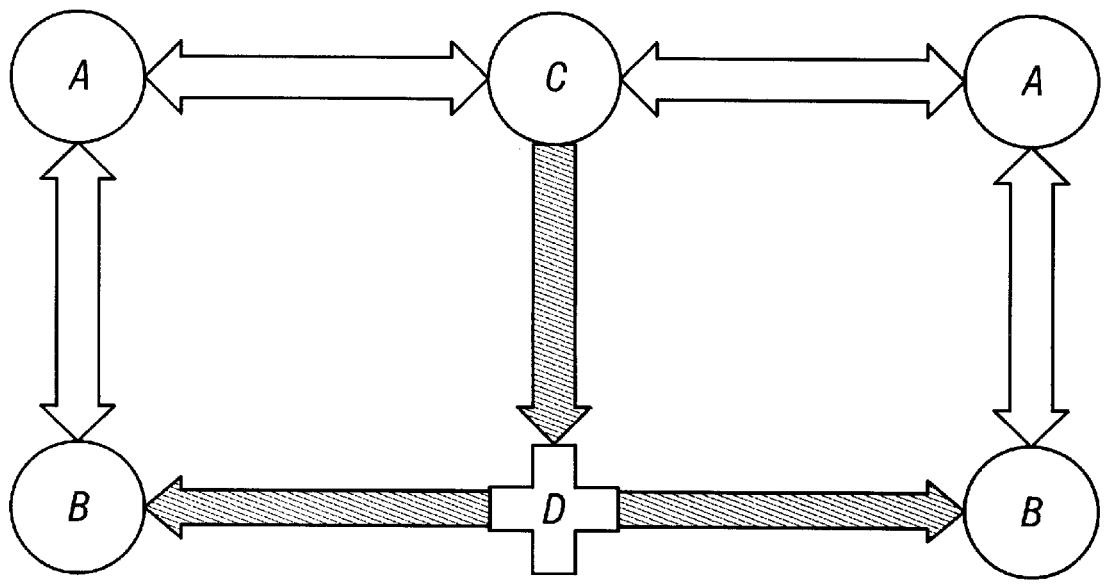

FIG. 19 is a drawing demonstrating the alignment of a new base station.

FIGS. 20A through 20H describe preferred software for a preferred embodiment of the present invention.

DETAILED DESCRIPTION OF PREFERRED EMBODIMENTS

Preferred embodiments of the present invention can be described by reference to the figures.

THE PICOCELL

Figure 1A:
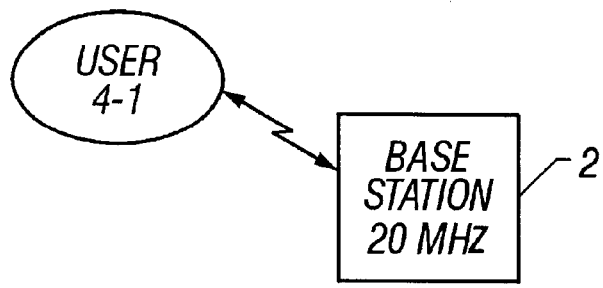
FIGS. 1A, 1B and 1C are drawings of picocells.
Figure 1B:
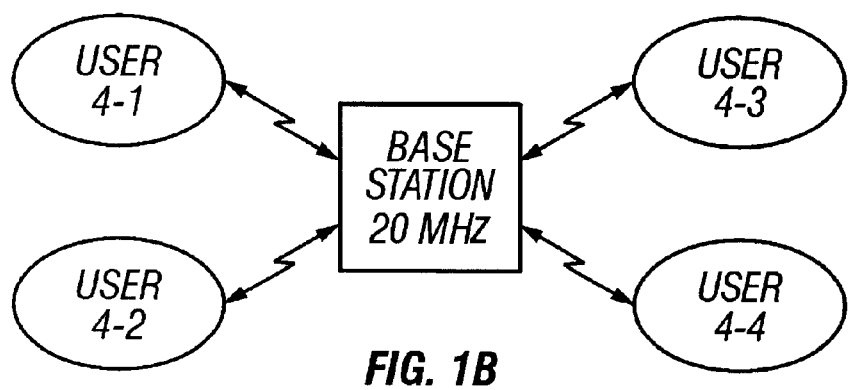
Figure 1C:
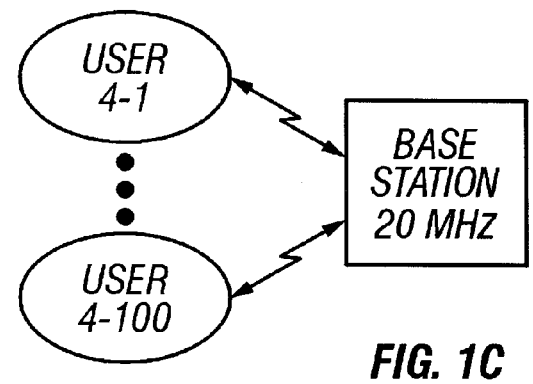

The principal element of a preferred embodiment of the present invention is the picocell. This preferred embodiment comprises a large number of picocells. Each picocell comprises a base station and at least one user but normally a few to a large number of users. FIG. 1A depicts a picocell consisting of a base station 2 and one user 4-1. This user has available to it the full 20 MHz allotted to the base station. FIG. 1B depicts a base station with four users which share the 20 MHz so that if all users where using the system at the same time an average band width limit would be about 5 MHz. If there were 100 users as indicated in FIG. 1C, the average limit would be 200 KHz. Each user 4 communicates with base station 2 by sharing the radio bandwidth assigned to the base station 2. With only a few users, each user has available to it a very large portion of the bandwidth available at the base station. For audio telephone communication only about 10 KHz is needed but for other types of communication much larger bandwidths are desirable. For example, one good two-way video communication link requires about 20 MHz; although satisfactory two-way links can be provided with about 2 MHz.

The Base Station

Figure 3:
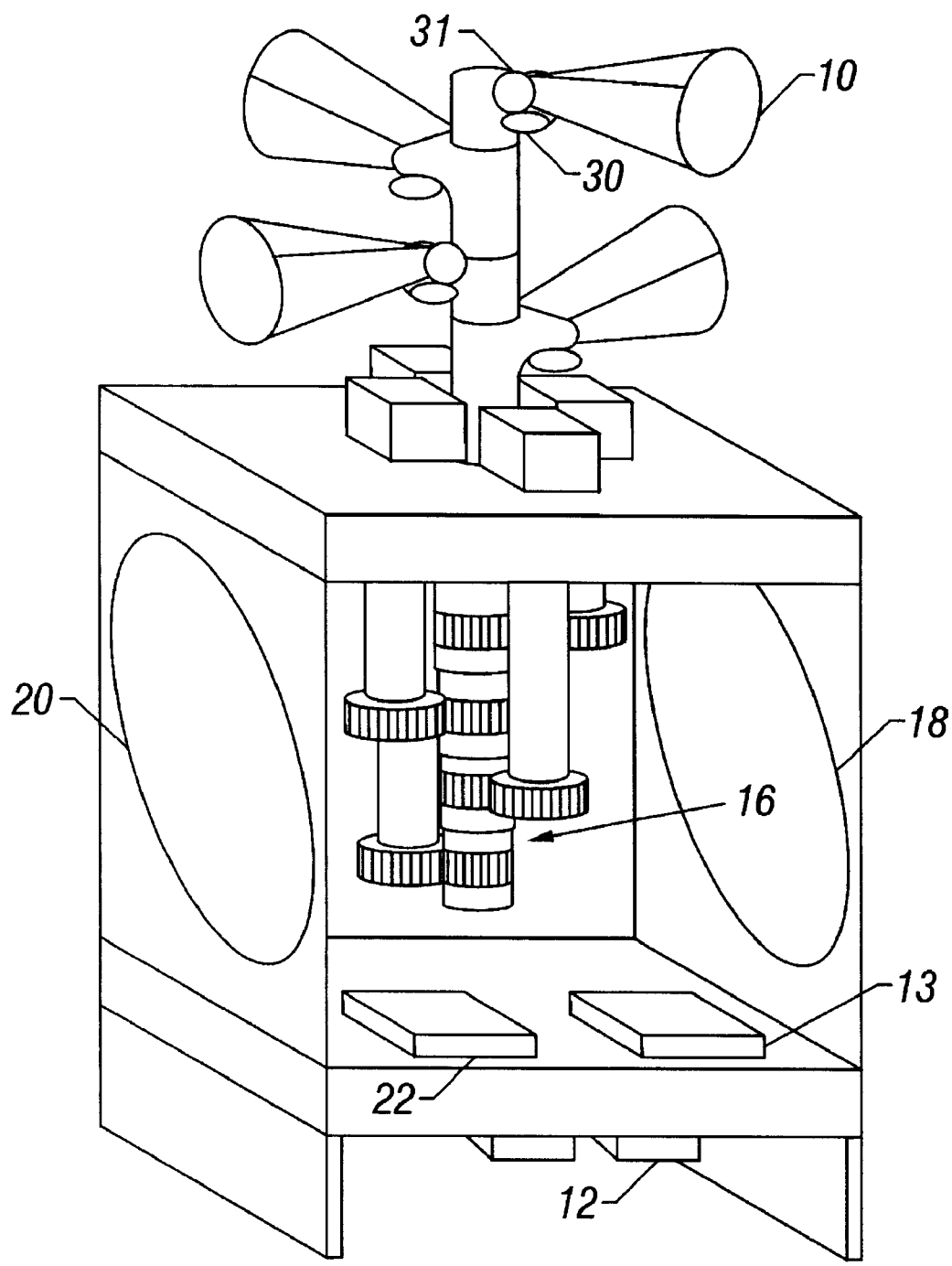
FIG. 3 is a schematic drawing of a picocell base station demonstrating the functioning of a preferred nested gimbal.
Figure 4:
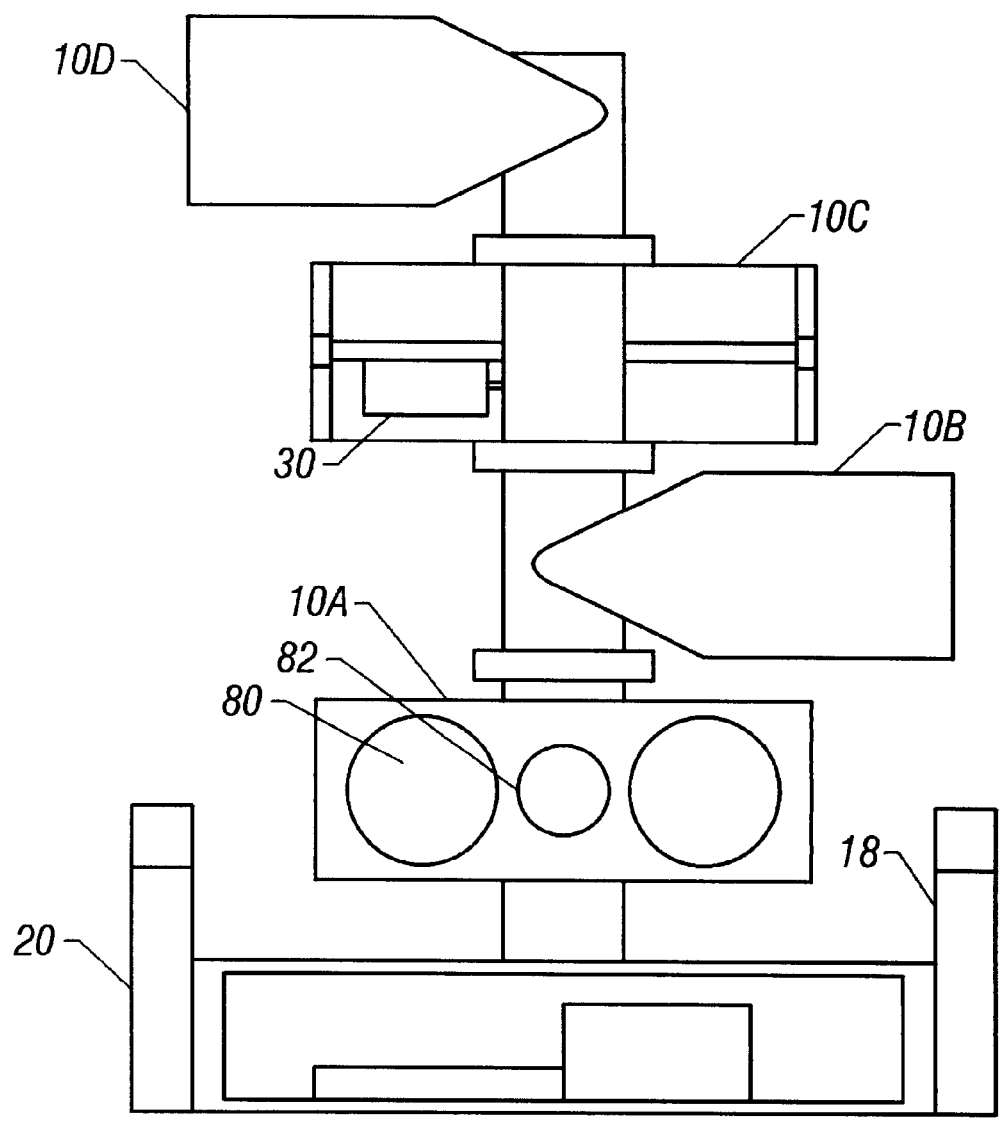
FIG. 4 is a drawing of prototype base station designed by Applicant showing the relative positions of elements of the base station.

The elements of a typical picocell base station of this preferred embodiment can be described by reference to FIG. 2. The base station comprises an RF transceiver 13, four laser transceivers 10, each with azimuth and elevation pointing equipment 11, a micro processor 22 for controlling the pointing equipment, a packet switch 12 for switching digital data among the RF transceiver and the four laser transceivers and a power supply. FIG. 3 is a schematic drawing of the base station shown in block diagram in FIG. 2. FIG. 4 is a drawing of a prototype base station designed by Applicant. The drawing shows transceiver 10A pointing out of the page and 10B pointing into the page and 10C and 10D pointing left and right. The azimuth-elevation gimbal is shown at 16. The 10A communication and beacon receiver is shown at 80. The 10A-beacon laser transmitter is shown at 82 and the 10A-communication laser transmitter is shown at 84. RF antennae are shown at 18 and 20. The 10B-elevation motor is shown at 30.

Laser Transceivers

Figure 10:
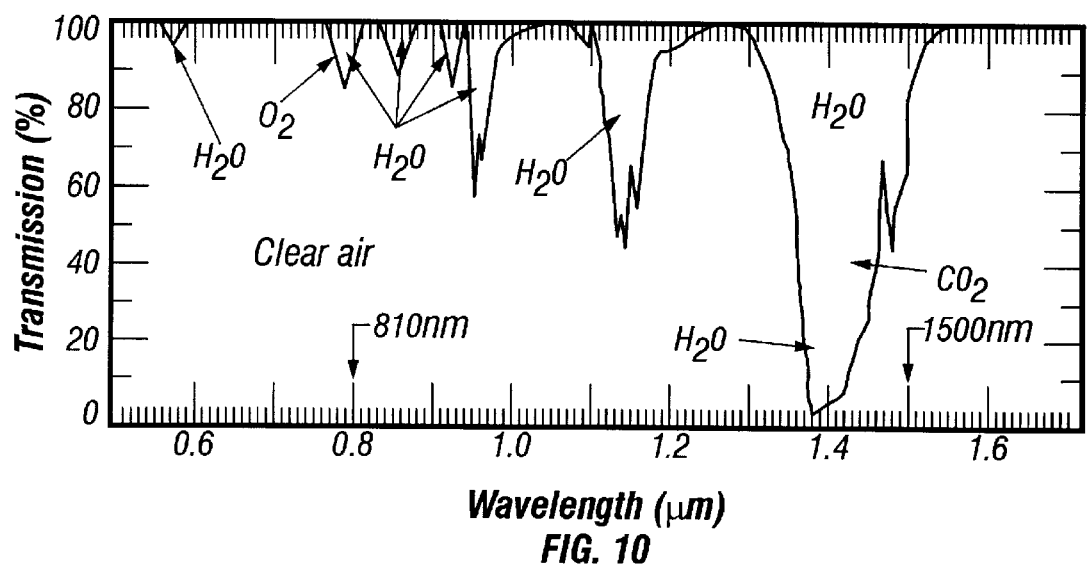
FIG. 10 shows transmission as a function of optical wavelengths.
Figure 11:
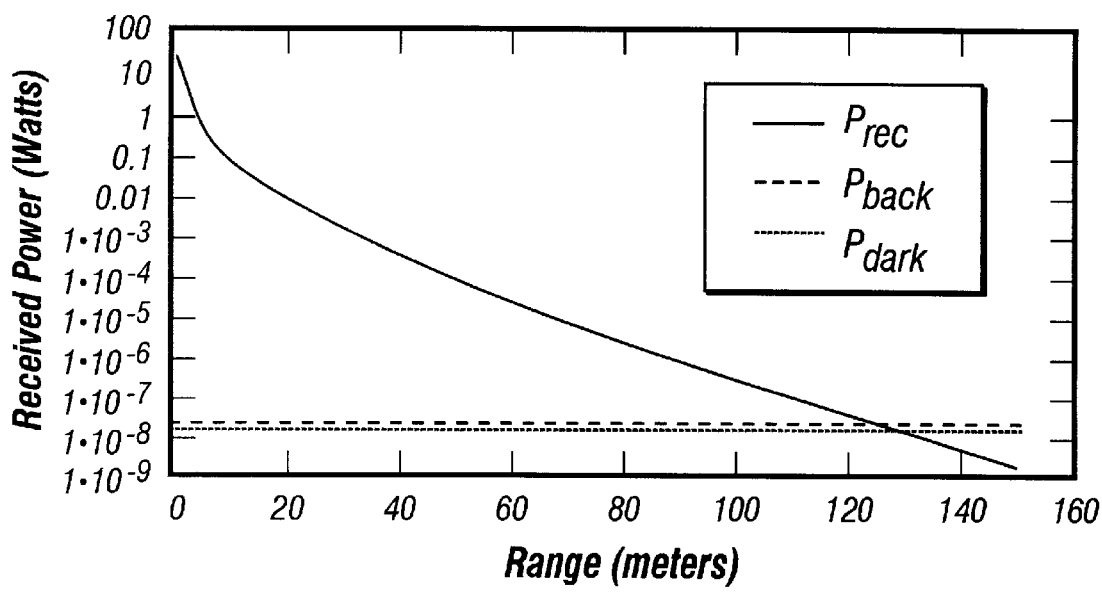
FIG. 11 shows laser power as a function of range in relation to noise.
Figure 12:
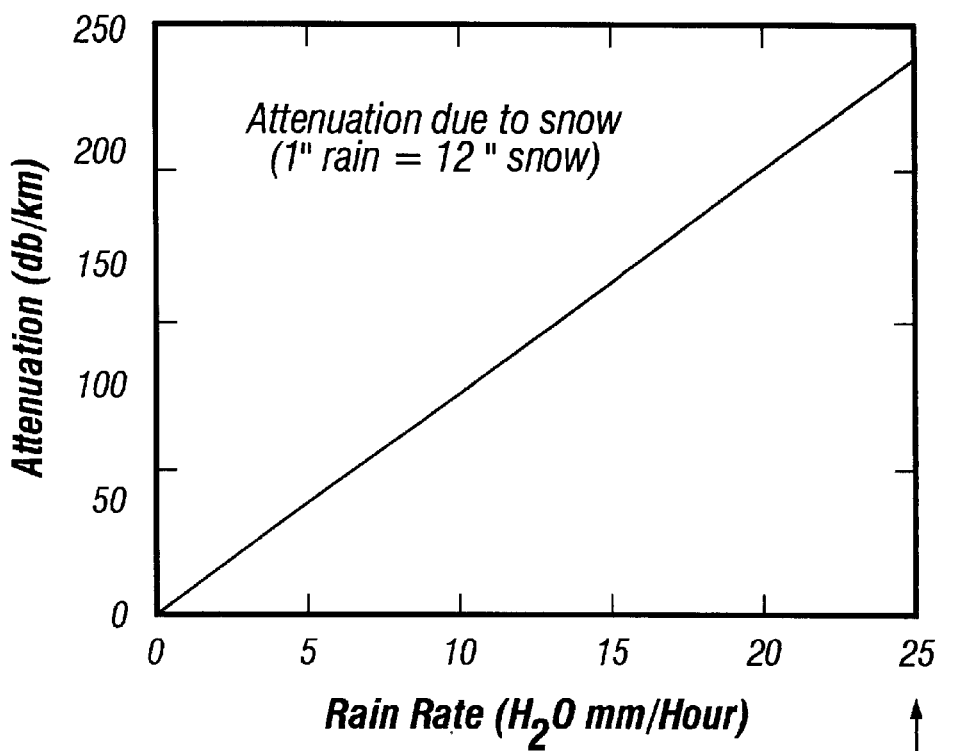
FIG. 12 shows attenuation in snow.
Figure 18B:
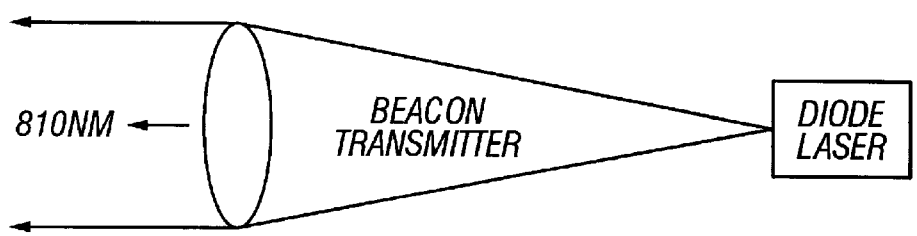
Figure 18C:
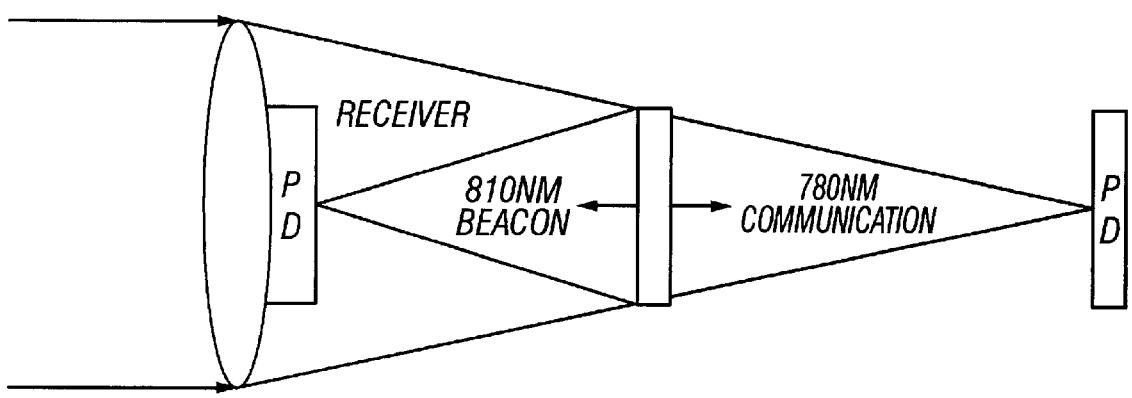

Four laser transceivers 10 are provided on each base station in this embodiment. Suitable laser transceivers are commercially available such as a four-inch diameter laser communications transceivers manufactured by AstroTerra Corporation, San Diego, Calif. (Model T-4 operating at 155 Mb/sec). FIGS. 18A, B and C describe the optical elements of a prototype transceiver designed by Applicant. In this embodiment the communication transmitter shown in FIG. 18A comprises a Hitachi 780 nm, 40 mW peak power, 2 mrad divergence diode laser transmitting through a 60 mm diameter f/2 singlet lens. The beacon transmitter shown in FIG. 18B comprises an EGG 810 nm, 20W pulsed, 0.1 percent duty cycle diode laser, with 2 degree divergence transmitting a cylindrical lens having a 100 mm focal length. The beacon/communication receiver comprises a 60 mm diameter f/2 singlet collecting lens and a dichroic beamsplitter which passes the 780 nm communication signal which is collected using a Hamamatsu PIN diode, 500 micron diameter with external preamplifier module with a 622 Mb/second 3 dB bandwidth. The beamsplitter reflects the 810 nm beacon beam onto a Hamamatsu quadrant photodiode with external preamplifier and a 1mm active area. Each laser transceiver is mounted on a nested gimbal. The gimbal is fabricated to allow each transceiver +/−30 degrees of motion in the elevation axis and a full 360 degrees of motion in the azimuthal axis. This is achieved in elevation by the motor and worm gear drive 30 and flexture pivots 31 shown in the FIG. 3. Azimuthal motion is obtained by nesting the azimuthal axes one inside of another, much like the hands of an analog watch as shown in FIG. 3. Each transceiver is then capable of 360 degrees of motion in azimuth by coordinating the motion of the nested azimuth gimbal axes so there is no interference from transceivers mounted in the same plane. By mounting the transceivers in two different planes there is multiple redundancy for the optical crosslinks since any transceiver can be aligned with a similar base station on another building. The motions of the gimbals are controlled by microprocessor 22. Each laser transceiver comprises a four-inch telescope and a detector module for receiving incoming laser communications and a laser transmitter for transmitting laser pulses. Information is transmitted and received with this transceiver at a rate of 622 Mb/sec. Each laser transceiver is aligned by centering the beacon signal of a companion transceiver on the quadrant photodiode as will be described below. The laser transmitted signal at a wavelength of 0.810 microns which as shown is FIG. 10 is transmitted almost 100 percent in clear air. Transmission under other atmospheric conditions is discussed below.

RF Transceiver

In this embodiment, the RF transceiver labeled "RF BASE STATION" in FIG. 15 operates in the PCS band with about 20 MHz in width centered at 1.9 GHz. In this embodiment we choose a 16 Quadrature Amplitude Modulation (QAM) signaling scheme. The probability of error can be calculated from Eb/N0 which can be obtained from the signal to noise ratio. For this embodiment the maximum distance between the base station and a mobile unit is 100 meters. The following parameters are readily obtainable from commercial off the shelf radio equipment supplied by manufacturers such as NorTel, Nokia, or Ericcson. The base station equivalent isotropic irradiated power (EIRP) is 17 dBW with an antenna gain of 20 dB, and a transmitted power of 0.5 W. The mobile receiver antenna gain is 3 dB. Total system losses are 6 dB. The mobile system receiver noise is 5 dB. The mobile system receiver antenna temperature is 290 K and its bandwidth is 20 MHz.

The free space loss is:

$$L_p = -20 \log \left[ \frac{0.16}{4\pi(100)} \right] = -78 \text{ dB}$$

The received power is:

$$P_R = -78 + 17 + 3 - 6 = -38 \text{dBW}$$

The equivalent temperature is:

$$T_e = 290K(N_f - 1) = 627K$$

The noise power is:

$$P_N = kT_e B_w = 1.38 \times 10^{-23} (627+290) \cdot (20 \times 10^6) = -127 dBW$$

The SNR is Pr/Pn, which is 88 dB. This gives Eb/No as:

$$\frac{E_b}{N_0} = \frac{88 \text{ dB}}{2 \log_2^4} \cong 5 \times 10^5$$

The probability of error is then given by:

$$P_e = \frac{1}{\log_2^4} \cdot \frac{3}{4} \cdot \text{erfc}\left(\left(\frac{E_b}{N_0}\right)^{1/2} \frac{(\log_2^4)^{1/2}}{3}\right)$$
$$= 0$$

There is no error associated with the radio link in this embodiment for free space paths. It is evident to persons skilled in the art that there is significant attenuation of radio signals at this frequency upon passage through building walls and floors. Since the attenuation is highly dependent on the particular materials and orientation, a computer simulation program such as WISE from ATT would be used to calculate the propagation characteristics throughout any chosen building.

Packet Switch

Figure 2:
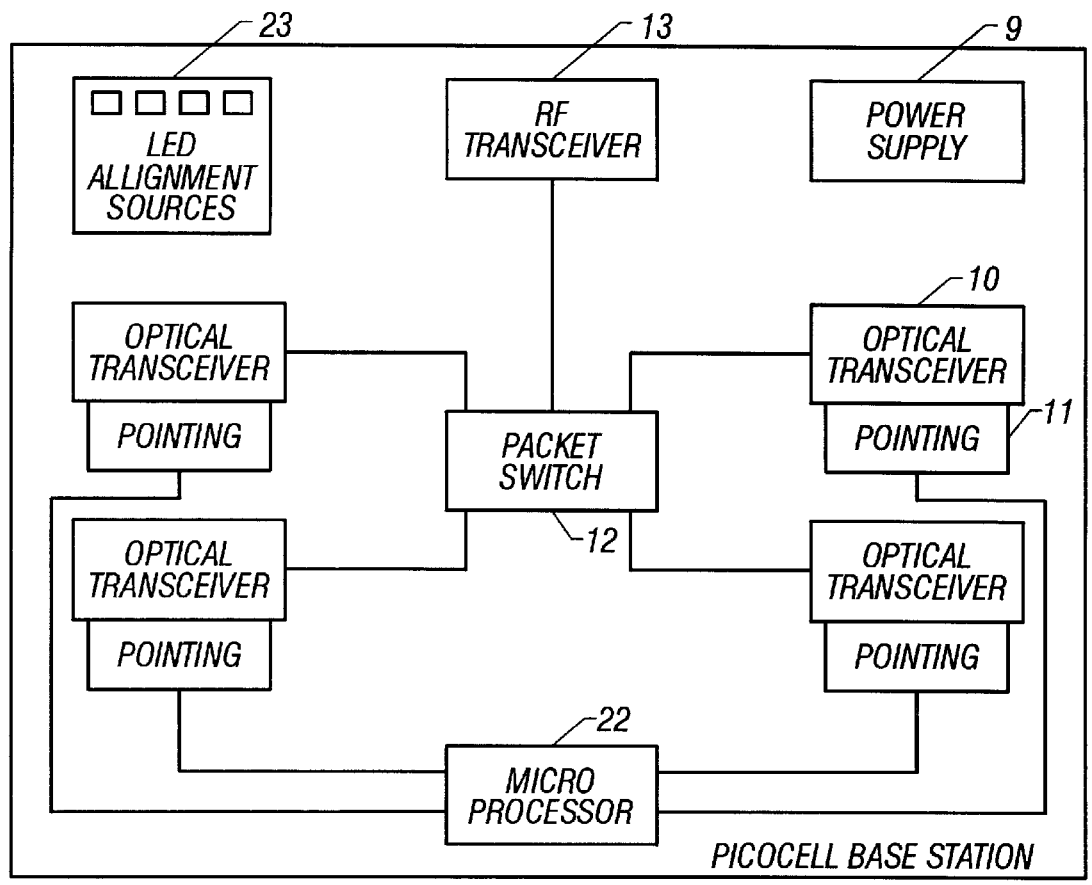
FIG. 2 is a block drawing of a picocell base station.

Packet switch 12 shown in FIG. 2 is a Fore Systems ForeRunner LE 155. It comes with 12 155 Mb/sec ports, of which five are utilized in this embodiment, in SONET/SDH format that with the addition of ForeThought (also Fore Systems) Internetworking software is used to operate the switch under an ATM protocol. The packet switch shown in FIG. 2 is interfaced with the four laser communications transceivers and radio transceiver 13 for full switching capability between the lasers and the radio in any given base station as well as routing packets between base stations. Radio transceiver 13 receives electrical signals through RF receive antenna 20 that correspond to radio waves transmitted from radio transmitters of users 4. Radio transceiver 13 also transmits electrical signals through RF transmit antenna 18 to the user's radio receive units.

Micro Processor and Pointing Equipment

The microprocessor in this embodiment is a Pentium PC. It is programmed to align the laser transceivers 10 in this base station with similar laser transceivers in other stations. The alignment process can be described by reference to FIG. 5 which depicts four buildings 1 separated from each other by about 100 meters, each with a base station located on their roofs. Microprocessor 22 initiates the first link 3 according to a predetermined algorithm which raster scans a given transceiver's 10 quadrant of +/−45 degrees in azimuth and +/−20 degrees in elevation. The scan rate is set at 0.5 degree/sec in azimuth and the elevation is stepped at 0.5 degrees per azimuthal scan to cover the entire sector. The entire sector can be scanned in four hours. Scanning can be accomplished easily at night when background light levels are low. For daytime scanning a bright LED source 23 of 10 watts emanating into π steradians can be used in each sector for a total of four sources on each base station. (If alignment can be done at night, much lower power LED's can be used.

The sources are shown on FIG. 2 but not on FIG. 3. For a probability of acquisition of 0.99 the SNR of source to background needs to be about 10, achievable with a 5 nm interference filter. This procedure is performed in parallel for all four transceivers.

User RF Communication

Users served by this preferred embodiment will typically communicate with the picocell base station with an RF communication device. A preferred radio unit is a RadioLAN2 7401/7402 PC Card. It is a high performance one piece wireless LAN adapter designed to meet the needs of mobile users that require LAN connectivity. This unit uses frequency hopping spread spectrum technology and is compatible with large area network communication systems. This particular unit operates at a data rate of 1.5 Mbps. The units can be purchased from RadioLAN in Sunnyvale, Calif.

Software

Figure 20A:
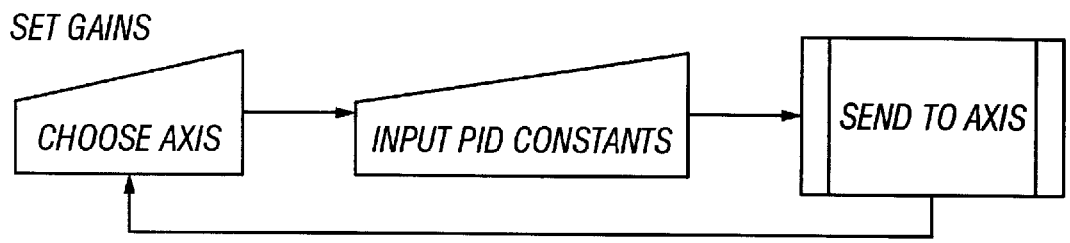
Figure 20B:
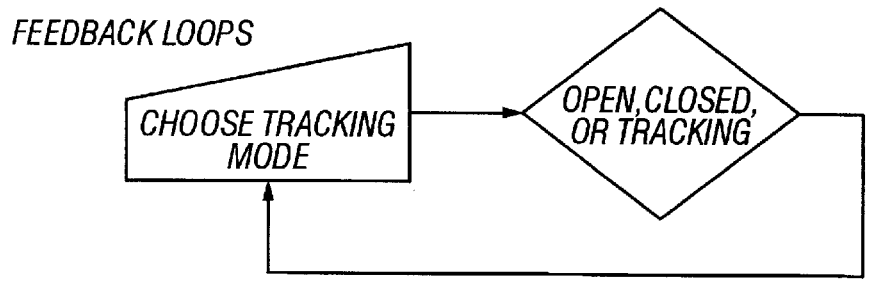
Figure 20C:
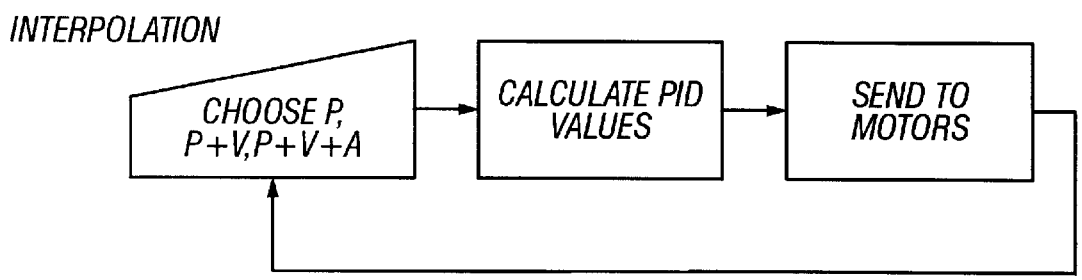
Figure 20D:
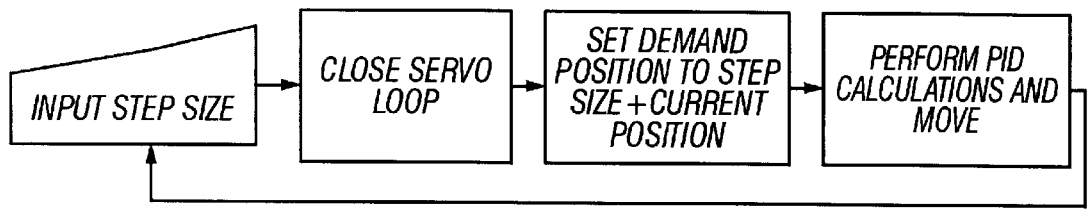
Figure 20E:
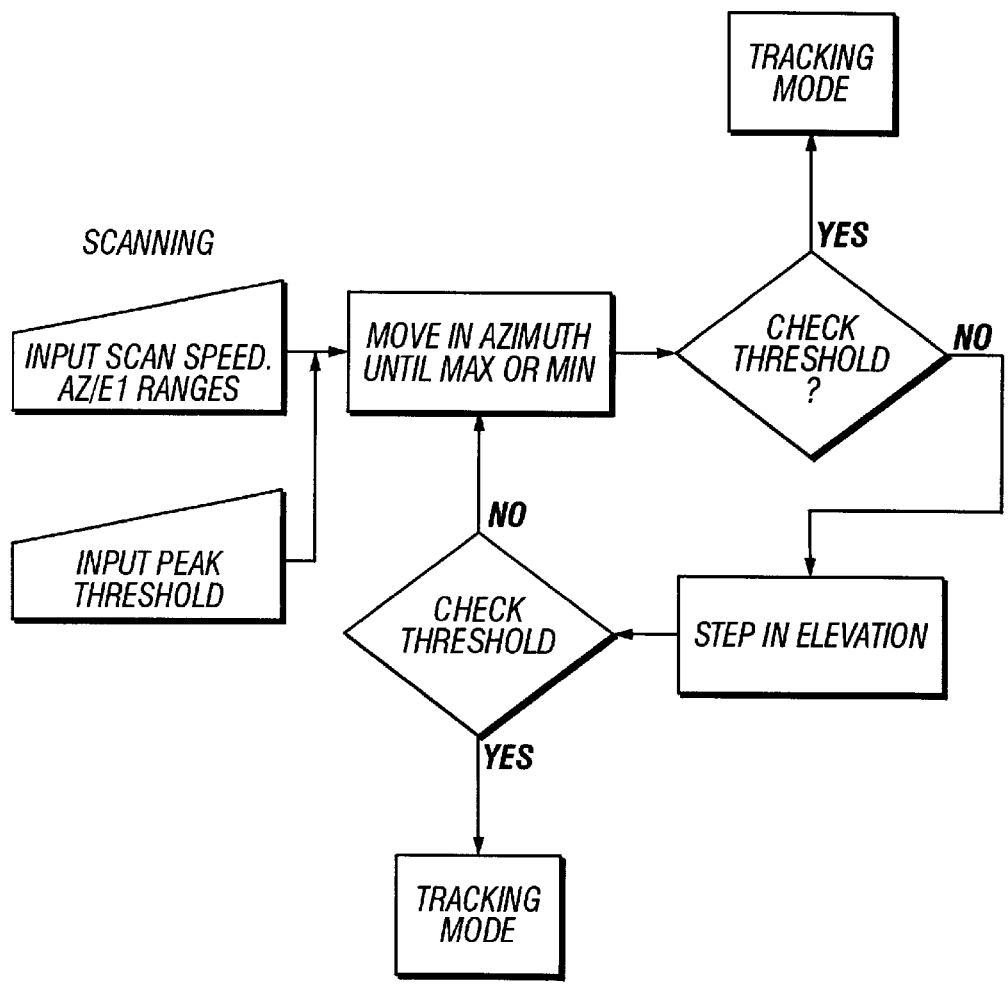
Figure 20F:
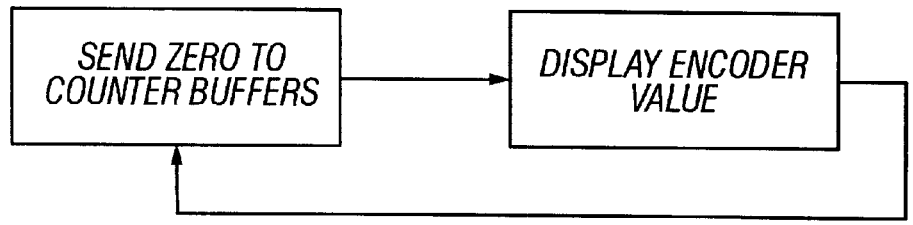
Figure 20G:
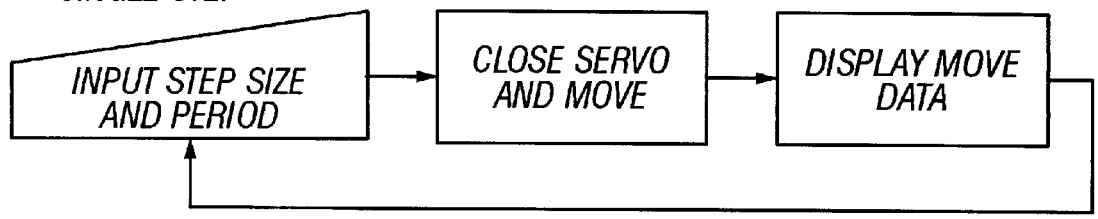
Figure 20H:
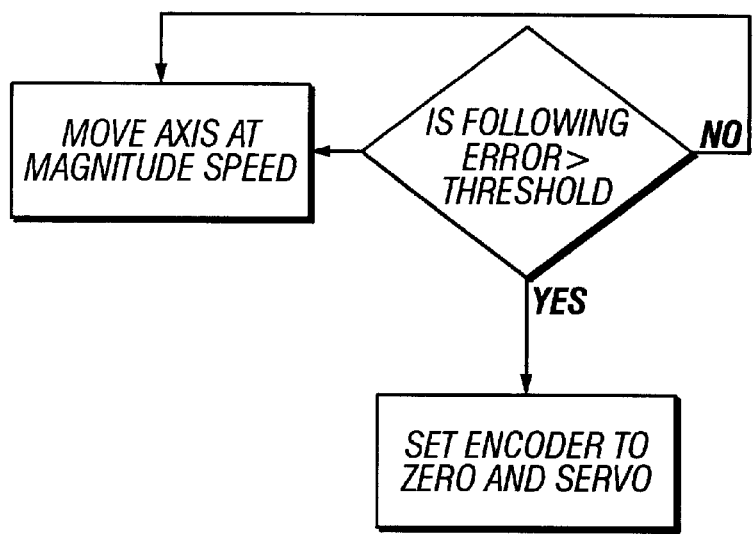

FIGS. 20A through 20F provides an outline of an example of a software flow control for the acquisition and tracking system for the picocell base station shown in FIG. 4. A rhomboidal box represents user inputs, decisions by a diamond and actions by a square. The FIG. 20A software provides a method of changing the proportional, integral, and derivative constants for each axis. The FIG. 20B software provides the ability of the system to go from open loop to closed loop to optical tracking mode with the click of a mouse. FIG. 20C shows the ability of the controller to change the control laws from proportional to proportional plus velocity to proportional plus velocity plus acceleration. FIG. 20D outlines the user's ability to choose a step size for either axis and close the servo loop. FIG. 20E shows the ability of the system to scan a predetermined uncertainty area, check the quad cell for above threshold data, and go into a tracking mode if the beacon signal is detected. FIG. 20F shows the ability to zero the encoder counters for initial calibration. FIG. 20G shows the ability to step and move a user selectable distance and time period. FIG. 20H shows the ability of system to find a home position strictly from encoder errors, not using a limit switch.

Performance Calculations

Applicant has performed modeling calculations to prove the feasibility of the present invention as a feasible and competitive communication system offering major advantages over alternative systems.

Model

Figure 5:
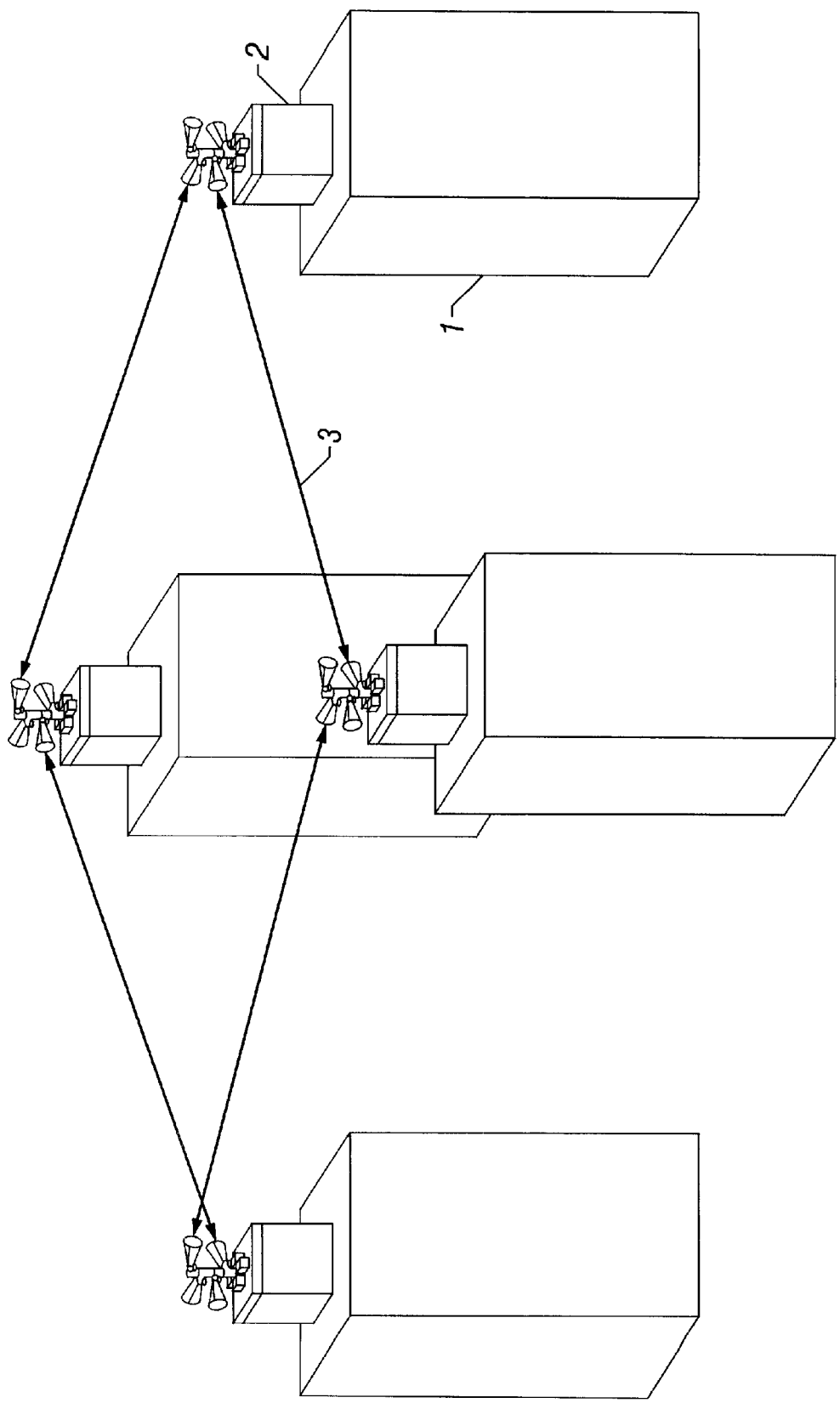
FIG. 5 shows optical communication links established between nearby buildings.

The picocellular base stations have the ability to establish optical communication links with other hybrid picocellular base stations, as shown in FIG. 5. Via optical communications links 3, the picocellular network provides wireless access to data, multimedia, and voice services at speeds of an order of magnitude greater than existing copper lines with costs that are a small fraction of the cost of installing a cable or fiber optic network. A dense mesh of short (115 meter) laser communications links 3, as shown in FIG. 5 interconnects the hybrid picocellular base stations. The shortness of these links allows for excellent performance results (essentially 100% availability) in spite of fog and other atmospheric disturbances. To function correctly it is imperative that the links are aligned with each other; however, the tolerances are such that the links can easily withstand extreme mechanical disturbances such as strong winds.

By means of optical communications links 3, traffic generated within (or delivered to) any picocell is relayed among a series of base stations 2 in a multihop arrangement, eventually entering (or leaving) the wired network at a local end office.

In the preferred embodiment, the radio footprint of each hybrid picocell is so small (i.e., about 115 meters in diameter) its bandwidth is shared by only a small number of users and therefore each user enjoys broadband (typically about 200 Kb/sec to 20 Mb/sec depending on the number of users and the available bandwidth of the base station) wireless service in his particular area. By re-using radio spectrum often, the problem of limited spectrum availability is surmounted. More importantly since each base station is serviced by laser communications links, new buried cabling apparatus is unnecessary and the capacity constraint of pre-existing copper wire is bypassed. Laser communications links are not licensed by the FCC and are capable of carrying 155–622 Mb/sec, sufficient for broadband access across the entire mesh with each user allocated 20 Mb/sec FIG. 5 is a diagram of four buildings 1 each equipped with a hybrid picocellular base station 2 mounted on the roof. The base stations are interconnected by laser communications transceivers that comprise the crosslink function between base stations. The down links to the users inside the buildings are performed at a nominal frequency of 1.9 GHz with spread spectrum RF transceivers. The down links communicate with telephones, computers, and HDTV. The optical transceivers provide a means for cross linking data from building to building such that the buildings are networked together. Each base station 2 provides a means for multi-hopping data from any building 1 to the end office where it can be switched into the public switched telephone network (PSTN) for wide area distribution.

Worse Case BER—Dense Fog

Figure 6:
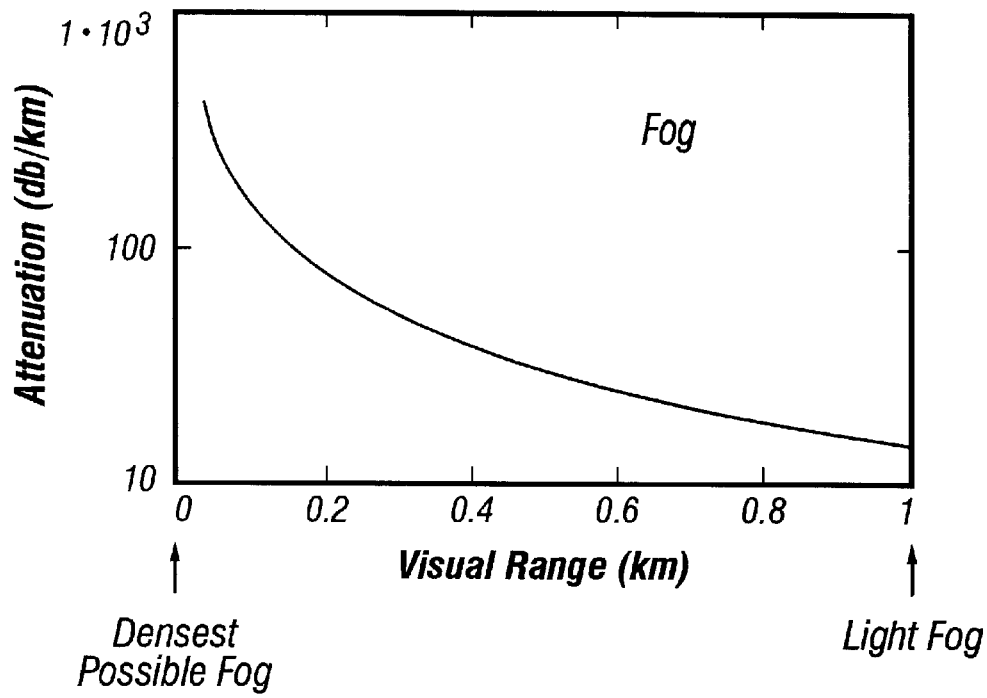
FIG. 6 shows optical attenuation in fog.

The predicted bit error rate for this system is determined by calculating the received power for each link. For 20 mW of transmit power and a beam divergence of 2 mrads we can calculate the BER as a function of range for various weather conditions. For 850 nm wavelength the worst attenuation conditions occur in dense fogs. As shown in FIG. 6, for visibility of 40 meters (an extremely rare and dense fog condition) the attenuation is roughly about 392 dB/km ($e^{-90.42/km}$). The received power in this condition is then:

$$P_R = 20 \text{ mW} \cdot \frac{0.008 \text{ m}^2}{(0.002 \text{ rad})^2 (100 \text{ m})^2 \cdot \frac{\pi}{4}} \cdot \frac{1}{2} \cdot e^{(-90.42/km)(0.1 \text{ km})}$$

$$= 2.6 \times 10^{-7} \text{ W}$$

Similarly the background power can be estimated by using the average value of the Sun's earth irradiance at the surface which is 0.2 W/m^2/nm/sr. The value of the backgound light is then:

$$P_B = \frac{0.2 \text{ W}}{\text{m}^2 \cdot \text{nm} \cdot \text{sr}} \cdot 0.008 \text{ m}^2 \cdot 10 \text{ nm} \cdot (0.002 \text{ rad})^2 \cdot \frac{1}{2}$$

$$= 3.2 \times 10^{-8} \text{ W}$$

Figure 7:
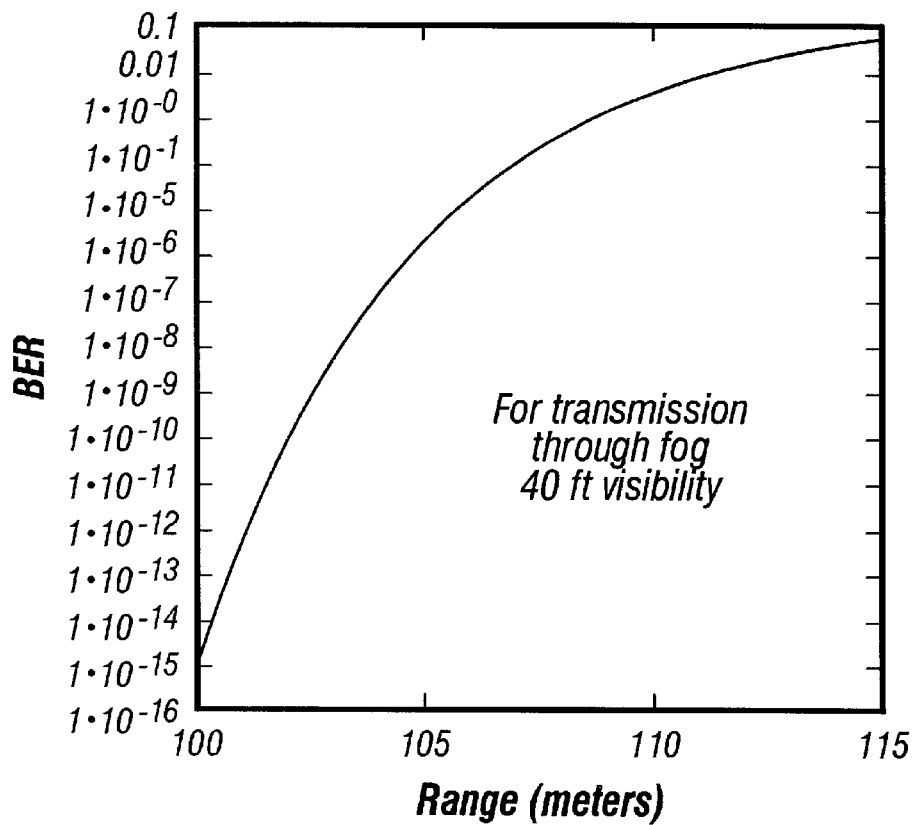
FIG. 7 is a plot of bit error ratio in dense fog as a function of distance over the range 100 meters to 115 meters.

Thus the estimated signal to background ratio at 100 meters in the densest fog is about 8. At 115 meters the signal to background ratio is about 2. Applicant's estimate of the bit error ratio for this worse case atmospheric condition in the range of 100 meters to 115 meters is presented in FIG. 7. Thus, the estimated worse case BER at 100 meters is about $1 \times 10^{-15}$ and close to 0.1 at 115 meters. Using a avalanche photodiode detector, the BER at 115 m can be brought down to $10^{-9}$. A BER lower than $1 \times 10^{-9}$ is considered satisfactory although some systems require a BER as low as $10^{-14}$. The above calculation assumes equal probabilities of ones and zeros and an optimal threshold value is used for each received signal value. The modulation scheme is On-Off Keying (OOK) with direct detection.

Other Atmospheric Conditions

Figure 8:
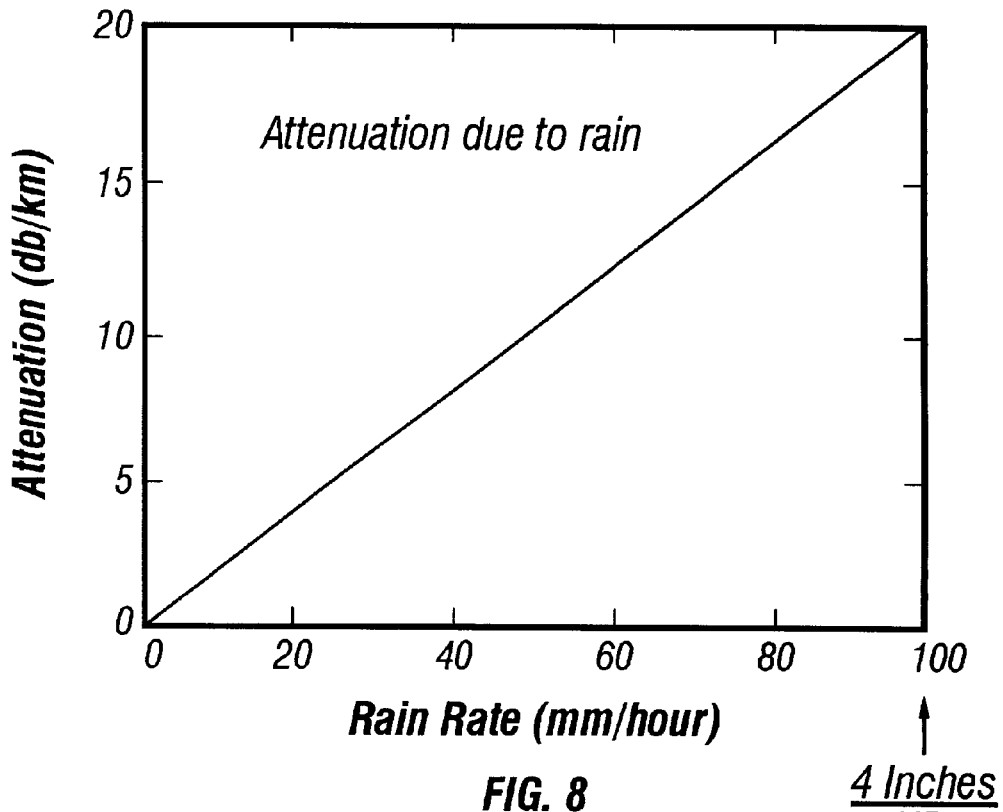
FIG. 8 shows attenuation in rain.

This particular embodiment will perform at acceptable BER for an ATM protocol at ranges to 115 meters, 15 meters in excess of the designed radio cell diameter in all weather conditions. FIG. 8 shows the predicted attenuation in rain and snow for different rain rates (and equivalent snow rates). The maximum rain attenuation is 20 dB/km at a rate of four inches per hour; over three orders of magnitude less attenuation then the fog case at 100 meters range. Snow has an order of magnitude less attenuation than the worst case fog at 100 meters range so the BER performance in either scenario will be better than that shown in FIG. 7 for fog.

Lasers are Eye Safe

The laser communications transceivers are eyesafe at the aperture, falling below the 2 mW/cm$^2$ called for in the ANSI Z.131.1-1986.

Scintillation

Another atmospheric effect to consider is scintillation caused changes in the refractive index along the propagation path. These scintillants scale in size as square root of wavelength times the range and therefore for this embodiment is approximately 1 cm in diameter at 100 meters range. This means that the laser communications transceivers are averaging over 50 scintillants, which greatly reduce (by a factor of about 100) the expected variation in signal due to scintillation. The expected scintillation probability density is given by:

$$P(1, \sigma_\chi^2) = \frac{1}{2I\sqrt{2\pi\sigma_\chi^2}} \exp\left[-\frac{(\ln I + 2\sigma_\chi^2)^2}{8\sigma_\chi^2}\right]$$

$$\approx \frac{1}{2I\sqrt{2\pi\sigma_I^2}} \exp\left[-\frac{(I - \langle I \rangle)^2}{8\sigma_I^2}\right]$$

For this path the variance is about 0.032 which means the resulting probability distribution is nearly Gaussian centered about the mean transmitted signal intensity with a standard deviation determined by Poisson statistics (approximately the square root of the number of received photons in a pulse). Therefore the BER equations used above are valid and scintillation has a negligible effect on this embodiment.

Changes of Index of Refraction Along the Path

The predicted beam wander due to variations in the index of refraction along the path can be calculated from:

$$\sigma_\theta^2 = \frac{4}{100^2} \cdot \int_0^{100} C_n^2(h(z))(R-z)^2(R\theta)^{-\frac{1}{3}} dz$$

$$\sigma_\theta \approx 100 \text{ }\mu\text{rad}$$

This works out to be about 100 microradians, a factor of 20 smaller than the transmitted beam divergence and is not a factor effecting this embodiment.

Deflection of Support Poles

Figure 9:
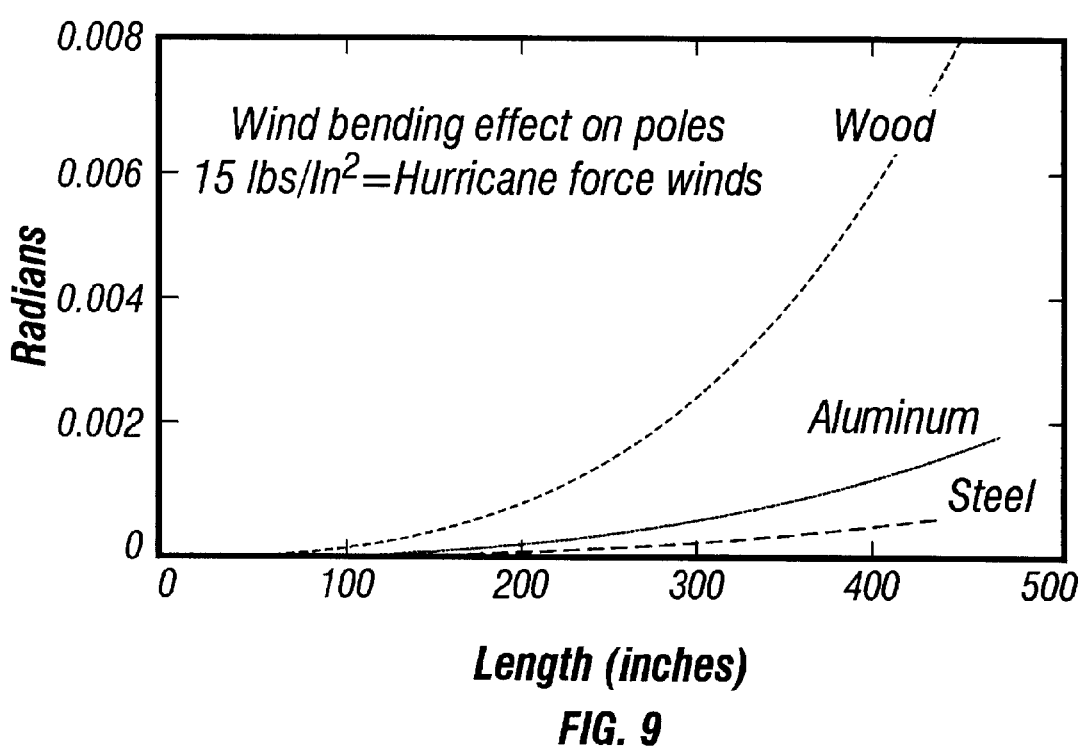
FIG. 9 is a graph showing pole bending in high winds.

The embodiment we describe here will have the transceivers mounted on poles at varying distances above either the street or roof of a building. The maximum deflection in a hurricane force wind of 15 lbs/in^2 can be calculated from:

$$\theta_{max} = \frac{1}{6} \cdot \frac{15 \, lb/in^2 \cdot 10 \, in \cdot L^3}{3 \times 10^7 \, lb/in^2 \cdot \frac{\pi}{4} \cdot (10 \, in)^4}$$

Where the pole diameter is 10 inches and the two materials used in this embodiment are aluminum and steel. FIG. 9 shows the predicted maximum deflection for poles of length 0 to 500 inches. In our embodiment no pole is longer than 25 feet. The maximum deflection in either case is not a significant fraction of our beam divergence and therefore winds will not effect the alignment of our device as described in this embodiment.

Thermal Effects

Thermal effects due to asymmetric thermal expansion of a building upon which a transceiver is mounted is given by:

$$\Delta\theta \approx 10^{-5} \cdot \frac{\Delta T}{3L}$$

For a change in temperature of 50 degrees celsius the angular displacement of a five-story building is less than 100 microradians, a negligible amount compared to the transmitted beam divergence.

Radio Link

The available spectrum in this embodiment is in the PCS band and is about 20 MHz in width centered at 1.9 GHz. In this embodiment we choose a 16 Quadrature Amplitude Modulation (QAM) signaling scheme. The probability of error can be calculated from $E_b/N_0$ which can be obtained from the signal to noise ratio. For this embodiment the maximum distance between the base station and a mobile unit is 100 meters. The following parameters are readily obtainable from commercial off the shelf radio equipment supplied by manufacturers such as NorTel, Nokia, or Ericcson. The base station equivalent isotropic irradiated power (EIRP) is 17 dBW with an antenna gain of 20 dB, and a transmitted power of 0.5 W. The mobile receiver antenna gain is 3 dB. Total system losses are 6 dB. The mobile system receiver noise FIG. is 5 dB. The mobile system receiver antenna temperature is 290 K and its bandwidth is 20 MHz.

The free space loss is:

$$L_p = -20 \log\left[\frac{0.16}{4\pi(100)}\right] = 78 \, dB$$

The received power is:

$$P_R = -78 + 17 + 3 - 6 = -38 \, dBW$$

The equivalent temperature is:

$$T_e = 290K(N_f - 1) = 627K$$

The noise power is:

$$P_N = kT_e B_w = 1.38 \times 10^{-23} \, (627 + 290) \cdot (20 \times 10^6) = -127 \, dBW$$

The SNR is Pr/Pn which is 63 dB. This gives Eb/No as:

$$\frac{E_b}{N_0} = \frac{63 \, dB}{2 \log_2^4} \cong 5 \times 10^5$$

The probability of error is then given by:

$$P_e = \frac{1}{\log_2^4} \cdot \frac{3}{4} \cdot \text{erfc}\left(\left(\frac{E_b}{N_0}\right)^{1/2} \frac{(\log_2^4)^{1/2}}{3}\right)$$
$$= 0$$

There is no error associated with the radio link in this embodiment for free space paths. It is evident to persons skilled in the art that there is significant attenuation of radio signals at this frequency upon passage through building walls and floors. Since the attenuation is highly dependent on the particular materials and orientation, a computer simulation program such as WISE from ATT would be used to calculate the propagation characteristics throughout any chosen building.

Routing

Multihop architecture is well known in the field of multi wavelength fiber optic networks but its application here is novel. This embodiment using a recursive grid (a quasi-rectangular mesh) to multihop has two benefits. One is the easy addition of new base stations without disturbing more than one optical link. The other is scalability of the routing algorithms which means that the computational complexity associated with the establishment of a multihop route for a new virtual connection scales linearly with the number of nodes in the grid. FIG. 15 shows four picocells, 61, 62, 63 and 64, all optically interconnected.

A preferred communication system is shown in FIG. 14. This approach uses three tiers of radio cells. These are the picocells, the standard cells and the megacells as shown in FIG. 14. The picocells have been described above. The second tier of cells is what Applicant calls the standard cells. Each standard cell covers an area measured in miles or tens of miles and a variable number of picocells ranging from zero up to several thousand. Each standard cell has a standard cell base station connected to an end office switch. The standard cell base station provides RF communication to users located in its area not served by a picocell. The standard cell base station also provides optical communication directly or indirectly to all picocells within its standard cell and communication to an end office switch. The communication channel or channels to the end office switch should be sufficient to handle the traffic. It may be free space optical or it may be conventional communication channels such as fiber optics.

Tracking and Acquisition

FIG. 16 shows a high level block diagram outlining the base station equipment for the proposed picocell system. This equipment includes several optical transceivers, the radio and baseband equipment, a small electronic packet switch (such as ATM), and a small control processor to manage the base station and serve as the local representative of the network control system. The radio equipment includes all of the apparatus necessary to accept/deliver signals from/to the switch and deliver/accept these to/from the antennas. The packet switch is needed so that in addition to serving as a source and sink of traffic placed onto the optical network, each base station can relay (hop) packets from one optical link to the next. The route is chosen at connection set-up time to maintain Quality of Service (QoS) guarantees, such that each packet arrives at an entry/exit port of the core network or terminates at a base station.

Each base station in this embodiment contains four laser communication cross-links. When the system is setup the user must install the unit on a stable platform, provide power, and the unit will self align each of the optical cross links to the correct neighboring nodes in the network of base stations. This requires the cross links to have a substantial field of regard over which to scan, a tracking sensor, a beacon laser, some network intelligence for determining to which base station to connect and network health and monitoring communications.

FIG. 17 shows a block diagram of the scanning and tracking hardware of a preferred embodiment designed by Applicant for operation of the base station shown in FIG. 4. Each of the laser communications cross links can move nearly 360 degrees in azimuth and plus or minus 30 degrees in elevation. This is accomplished in a compact package by using a novel nested gimbal approach as shown in the figure. Each optical head has a pulsed beacon laser transmitter with a divergence of ten degrees for efficient searching while maintaining enough margin for operation in the heaviest fogs. Also located in the optical head is a quad cell for receiving the tracking beacon laser energy from the opposite unit. The quad cell has a field of view of two degrees to minimize interference from background light. The quad cell is interfaced to a microprocessor, which calculates error signals and drives the gimbal motors for each axis to minimize those errors thereby closing the tracking loop on the system.

A potential search condition is a two-by-two degree receiver field of view with a dwell time on each search cell of one second and a field of uncertainty of pi steradians. This gives a search time of 2718 seconds or a little over 45 minutes. There are 2718 cells to dwell on, with the total possible number of false alarms is 2717. The probability of a successful detection and no false alarms is given by:

$$P_{acq} := P_{detect} \cdot (1 - P_{false})^{N-1}$$

where N=2718 and Pdetect and Pfalse are calculated from the link budget. The probability of a successful detection or false alarm is given by:

$$P_{detect}(R, V_t) := Q\left(\frac{V_t - v_{one}(R)}{\sigma_{one}(R)}\right)$$

$$P_{false}(V_t) := Q\left(\frac{V_t - v_{zero}}{\sigma_{zero}}\right)$$

where $V_t$ is the optimal threshold for determining if the beacon signal is there, $v_{one/zero}$ is the voltage generated from the detector as a function of range and $\sigma_{one/zero}$ is the standard deviation of the voltage. Q is the "Q-function" related to the error function for calculating the relative areas under Gaussian distributions. For this system the beacon laser is pulsed with a peak output power of 19 watts at a 0.07% duty cycle for eyesafety. The range is 100 meters, the attenuation conditions are heavy fog, 392 dB/km, and the receive aperture is about 2 inches in diameter. This gives a value for Pdetect of 0.994 and a value of $P_{false}$ of $8.6 \times 10^{-7}$ which after substitution into the formula above gives the probability of successful acquisition as 0.992 for a single sweep of the volume.

The above discussion assumes that the opposite base station is already pointing at the new base station which is in general, not the case. The opposite base station must also scan the volume where the new base station is supposed to be (within steradians). A key to the scanning algorithm will be to determine the rate at which the base station scans the field of uncertainty. Since the beacon transmitter divergence is ten degrees it can cover the field of uncertainty much more rapidly than the receiver. If the dwell time were 0.25 seconds per cell for the beacon transmitting base station then the beacon will scan the entire field of uncertainty in under 30 seconds. In the worst case the receiver could dwell on each area for the entire 30 seconds of the transmitter scan, thereby guaranteeing successful acquisition. The worst case, total acquisition time would be about 21 hours. This guarantees not inducing undesirable oscillating scanning motion, i.e. trackers never looking at the same point simultaneously and forever scanning about their respective fields of regard. The optimal algorithm is probably somewhere in between, where the receiver is scanned faster, with a slight chance of missing the transmitter but with a large reduction in total acquisition time. Acquisition can be made much quicker if each base station is programmed with approximate geographical coordinates of itself and its neighboring base stations.

Once the transceivers have acquired each other and closed the tracking loop, the beacon channel can be used for low data rate communications. Information on base station health, network congestion, and base station ID can be exchanged independently of the data communication channel. In fact, if the communications channel were lost due to a failed detector or laser, the base station could still pass on information about network status to the other base stations, improving network robustness and reliability. Since the beacon laser is pulsed, a pulse position modulation scheme will be employed. Applicant estimates that a data rate of 4800 bps over the beacon channel is achievable with this method. This is satisfactory for passing network health, congestion, and status information between nodes.

Another key benefit of using the beacon laser channel for communications is the ability to send a word of data to a neighboring base station, having that base station retransmit the word back to its source and measuring the time of flight. This gives range information which combined with encoder information from existing links makes subsequent search and acquisition significantly faster. FIG. 19 shows a network of five existing base stations represented by circles and a sixth, new base station represented by a cross. Once the new base station (D) closes a link with any existing in network base station (B or C in this case), the beacon channel will be able to transmit the angle and range information such that the new base station should be able to immediately close all desired links with the existing network. The on board microprocessor is easily capable of performing the geometrical calculations. The assumption is that the base stations are level with respect to gravity normal upon installation. Network congestion information also improves and simplifies the algorithms for multihopping. Multihopping is important to enable the use of very short free space optical links to insure freedom from atmospheric disturbances and good link availability. The packet switch dimensionality should be at least 5x5, i.e. five input/output paths so that in addition to the signals arriving from/sent to the radio interface, at least four optical transceivers can be supported. This switch is electronic, both optical and radio signals are first converted to baseband electronic signals as in most multihop arrangements.

The multihop architecture is well known within the field of wavelength multiplexed fiber optical networks but its application to free space optical networks is novel, as is the idea of connecting base stations via free space optical links, avoiding local wireline bottlenecks. The actual interconnection pattern of the optical network might consist of a recursive grid, a quasi rectangular mesh in which nesting of access stations into sublevels is allowed to enable the easy addition of new access stations without disturbing more than one pre-existing link. Recursive grids are also beneficial in that they are compatible with scalable routing algorithms, meaning that the computational complexity associated with the establishment of a multihop route for a new virtual connection scales linearly with the number of nodes in the grid, that is, the computational complexity per node is independent of the number of nodes in the grid.

Although the above description contains many specificities, these should not be construed as limiting the scope of the invention. For example, some of the links between picocells could be conventional communication links such as twisted wire or coaxial cable or fiber optics instead of free space optical communication links. Also, some of the links between the users and the base stations could be conventional communication links other than RF. For example, all of the users in an office building could be connected by coaxial cable or twisted wire to a base station on top of the building utilizing the existing communication equipment in the building. Also, it may be convenient to set up a communication system as described herein and gradually convert the links between base stations from free space optical to fiber optics. Thus the scope of the invention should be determined by the appended claims and their legal equivalents, rather than by the examples given.

I claim:

1. A communications system, comprising:
   a first picocell assembly, said first picocell assembly including a first base station with a first plurality of optical transceivers that are connected to one another, at least one of said first plurality of optical transceivers operating to establish an optical communication link with one of a second plurality of optical transceivers, said at least one of said first plurality of optical transceivers including a pointing mechanism adapted to independently align said at least one of said first plurality of optical transceivers of said first picocell assembly with one of said second plurality of optical transceivers, and said first picocell assembly also including a second communicating element operating to communicate with a user within an area of said first picocell assembly, said second communicating element connected with at least one of said first plurality of optical transceivers and allowing communication over said at least one of said first plurality of optical transceivers, and said first picocell assembly also including a control element that controls communication between said second communicating element and said at least one of said first plurality of optical transceivers to one of said second plurality of optical transceivers; and
   a second picocell assembly, said second picocell assembly including a second base station with said second plurality of optical transceivers that are connected to one another, at least one of said second plurality of optical transceivers operating to establish an optical communication link with said at least one of said first plurality of optical transceivers of said first base station of said first picocell assembly, said at least one of said second plurality of optical transceivers including a pointing mechanism adapted to independently align said at least one of said second plurality of optical transceivers of said second picocell assembly with said at least one of said first plurality of optical transceivers of said first picocell assembly, and said second picocell assembly also including a second communicating element operating to communicate with a user within an area of said second picocell assembly, said second communicating element of said second picocell assembly connected with at least one of said second plurality of optical transceivers and allowing communication over said at least one of said second plurality of optical transceivers, and said second picocell assembly also including a second control element that controls communication between said second communicating element of said second picocell assembly and said at least one of said second plurality of optical transceivers and to said at least one of said first plurality of optical transceivers of said first picocell assembly.

2. A device as in claim 1, wherein said second communicating element operates using radio frequency.

3. A device as in claim 1, wherein said second communicating element operates using a wired connection.

4. A system as in claim 3, wherein said wired connection is a coaxial cable.

5. A system as in claim 3, wherein said wired connection is a twisted wire connection.

6. A system as in claim 3, wherein said wired connection is a fiber optic connection.

7. A system as in claim 1, wherein said control element comprises a microprocessor running a program to aim said at least one of said first plurality of optical transceivers of said first picocell assembly to one of said second plurality of optical transceivers of said second picocell assembly and to control communications therebetween.

8. A system as in claim 1, wherein said second communication element of each of said picocell assemblies includes the capability of communication with a plurality of separated user communication devices.

9. A system as in claim 1, wherein each said picocell assembly includes four transceivers, each aiming in different directions.

10. A system as in claim 1, further comprising a plurality of additional picocell assemblies, each having the same construction as said first picocell assembly.

11. A communications system, comprising:
    a first picocell assembly, said first picocell assembly including a first base station with a first plurality of optical transceivers that are connected to one another, at least one of said first plurality of optical transceivers operating to establish an optical communication link with one of a second plurality of optical transceivers in a second picocell assembly, said at least one of said first plurality of optical transceivers including a plurality of pointing mechanisms adapted to independently align said at least one of said first plurality of optical transceivers of said first picocell assembly with said one of said second plurality of optical transceivers of said second picocell assembly, and said first picocell assembly also including a second communicating element operating to communicate with at least a plurality of users within an area of said first picocell assembly, said second communicating element connected with said first plurality of optical transceivers and allowing communication over any of said first plurality of optical transceivers to said second picocell assembly.

12. A system as in claim 11, wherein said first picocell assembly also includes a control element that controls communication between said second communicating element and said at least one of said first plurality of optical transceivers with said plurality of users.

13. The system as in claim 11, wherein the second communicating element communicates using packeted communications.

14. A communications system, comprising:
a first picocell assembly, said first picocell assembly including a first base station with a first plurality of optical transceivers that are connected to one another, at least one of said first plurality of optical transceivers adapted to establish an optical communication link with one of a second plurality of optical transceivers in a second picocell assembly or a third plurality of optical transceivers in a third picocell assembly, said at least one of said first plurality of optical transceivers including a pointing mechanism adapted to independently align said at least one of said first plurality of optical transceivers of said first picocell assembly with said one of said second plurality of optical transceivers of said second picocell assembly or with said one of said third plurality of optical transceivers of said third picocell assembly, and said first picocell assembly also including a second communicating element operating to communicate with at least a plurality of users within an area of said first picocell assembly, said second communicating element connected with said first plurality of optical transceivers and allowing communication over any of said first plurality of optical transceivers to said second picocell assembly or to said third picocell assembly.

15. The communication system of claim 14, wherein said first picocell assembly also includes a control element that controls communication between said second communicating element and said at least one of said first plurality of optical transceivers with said plurality of users.

* * * * *